Feb. 12, 1957 G. G. ENSIGN ET AL 2,781,414
ELECTRICAL ENERGY PRODUCING CELLS
AND METHOD OF MAKING THE SAME
Filed July 3, 1952 3 Sheets-Sheet 2
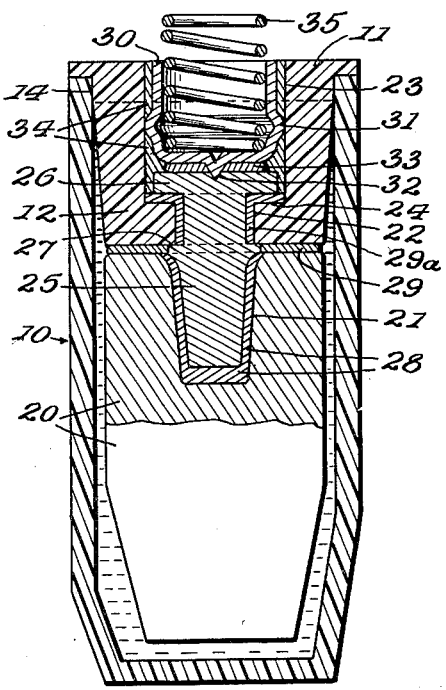
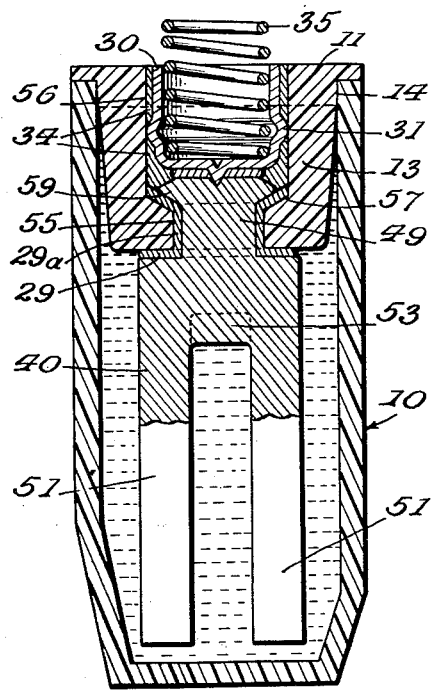
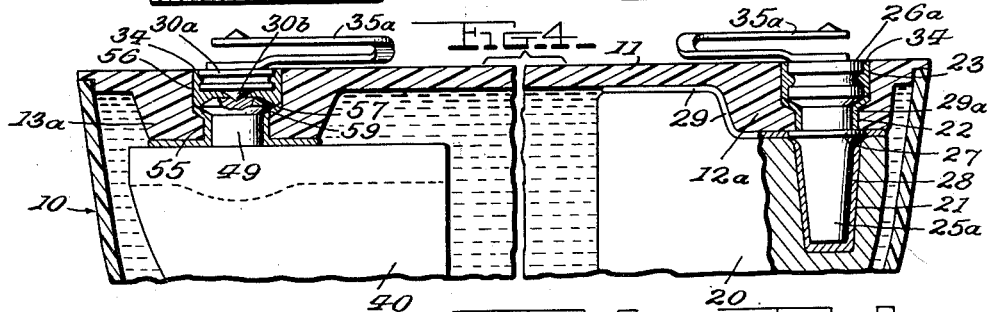
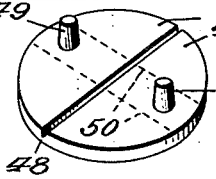
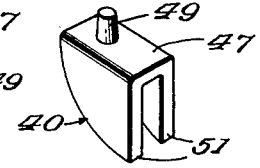
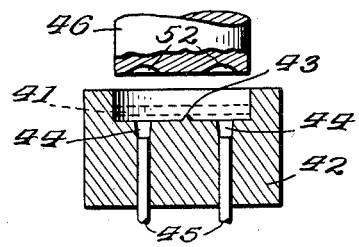
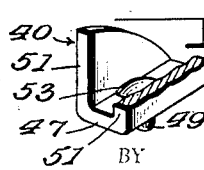
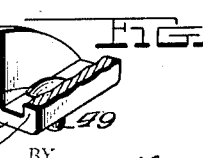
INVENTORS
George G. Ensign
and
Thomas L. Boswell,
BY
Mason, Porter, Diller & Stewart,
ATTORNEYS Feb. 12, 1957　　　G. G. ENSIGN ET AL　　　2,781,414
ELECTRICAL ENERGY PRODUCING CELLS
AND METHOD OF MAKING THE SAME
Filed July 3, 1952　　　　　　　　　　　3 Sheets-Sheet 3
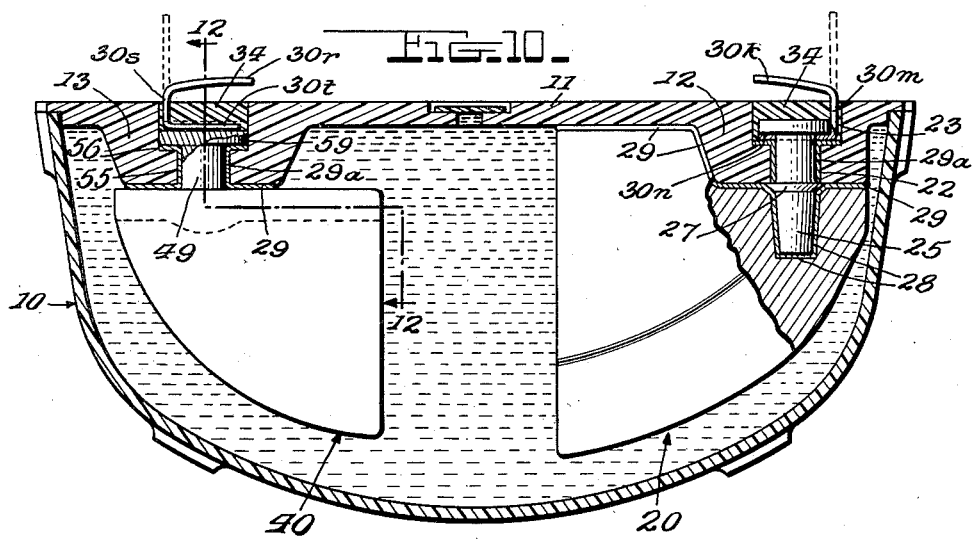
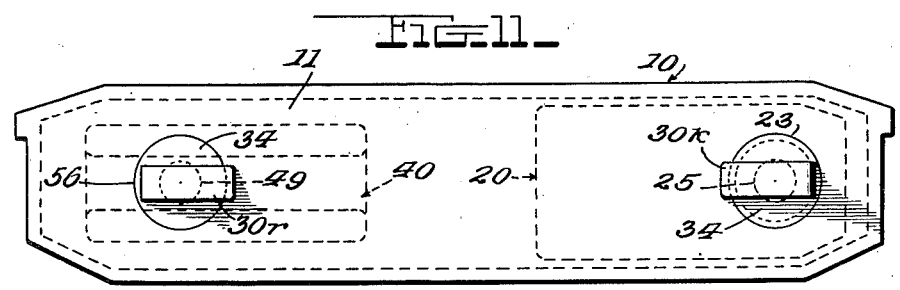
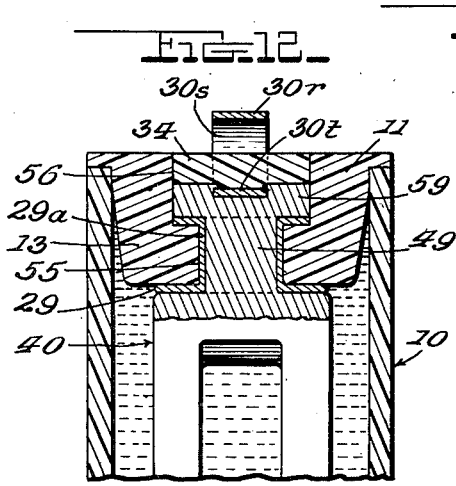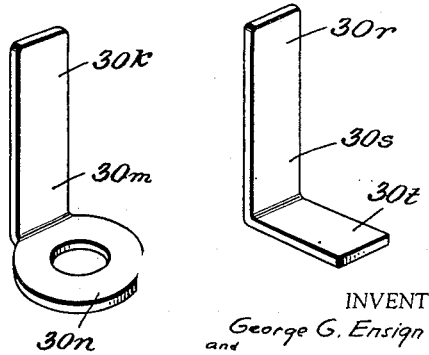
INVENTORS
George G. Ensign
and
Thomas L. Boswell,
BY Mason, Porter, Diller + Stewart,
ATTORNEYS.

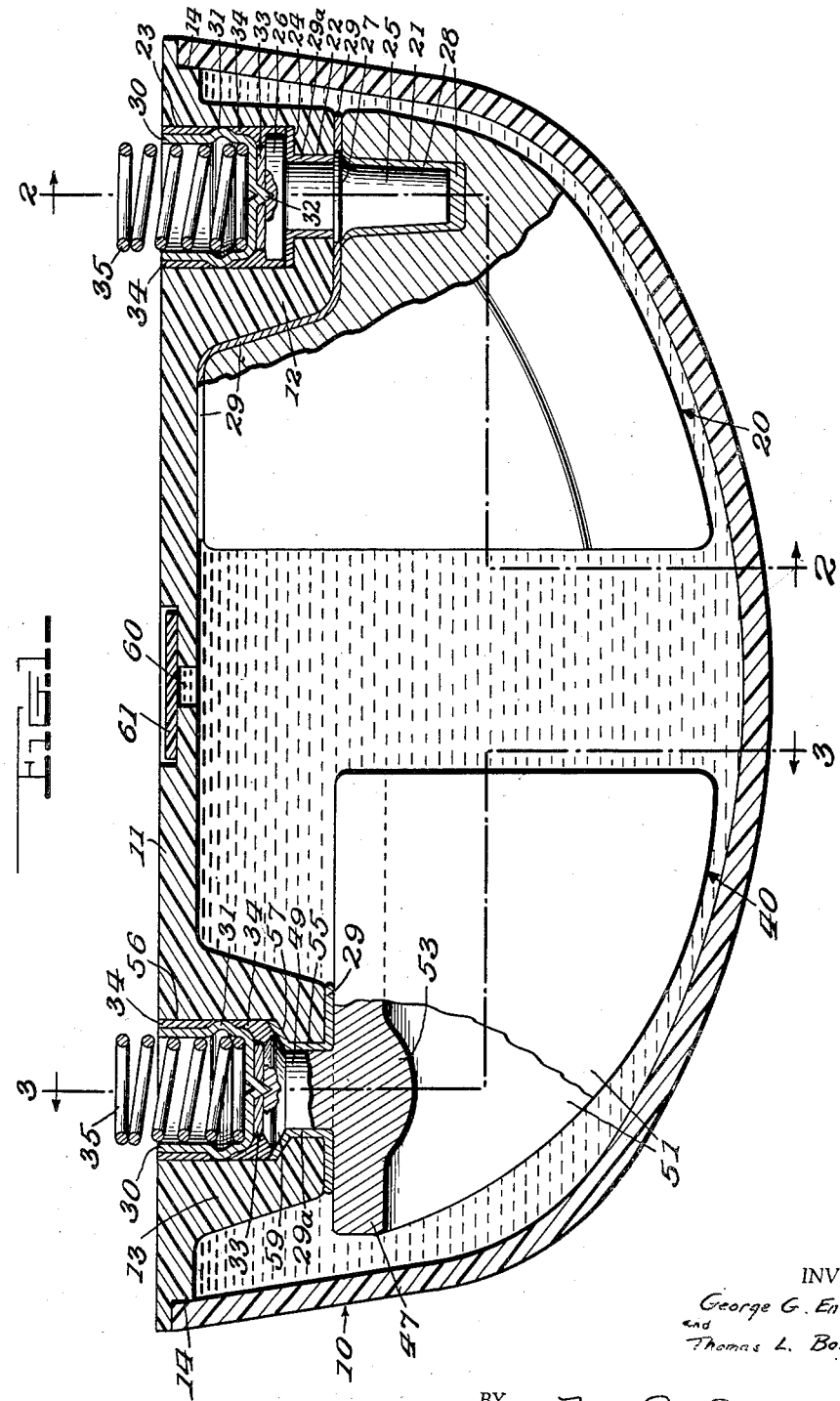

United States Patent Office 2,781,414
Patented Feb. 12, 1957

2,781,414

ELECTRICAL ENERGY PRODUCING CELLS AND METHOD OF MAKING THE SAME

George G. Ensign and Thomas L. Boswell, Elgin, Ill., assignors to Elgin National Watch Company, Elgin, Illinois, a corporation of Illinois Application July 3, 1952, Serial No. 297,012

31 Claims. (Cl. 136—133)

This invention relates to electrical voltaic or electrical energy producing cell constructions which are of particular value for cells of small size.

A feature of the invention is the provision of a sealed cell structure including terminals sealed against seepage of electrolyte and escape of electrolyte under pressure.

Another feature is the provision of a cell comprising a receptacle, a cover, electrodes mounted on the cover and including terminals having external parts resistant to ambient conditions, one electrode having an inner terminal part of material of different electrochemical potential to its respective external terminal part, and sealing and supporting arrangements for preventing the formation of parasitic voltaic effects.

A further feature is the provision of a cell in which a conductive junction between an electrode and its external terminal is provided within the cell structure in isolated relation to the main receptacle portion thereof whereby the electrolyte is prevented from access to the junction during the service life of the cell.

A further feature is the provision of a sealed cell filled with electrodes and electrolyte, the electrodes constituting about one-half of the internal volume of the cell.

Another feature is the provision of a sealed cell comprising a receptacle having a pair of closely spaced walls with arcuate edges and a peripheral connecting wall, said walls providing a mouth, and a cover closing and sealing the mouth and supporting electrodes and electrode terminals in sealed condition.

A further feature is the provision of a sealed cell comprising a receptacle, a cover sealing the receptacle, and electrodes and electrode terminals mounted on and in the cover and including conductor springs projecting beyond the cover surface.

Another feature of the invention is the provision of a cell terminal arrangement in which an insulating support mechanically receives and holds an electrode projection and an electrolyte-resistant cement bonds the support and electrode together and also serves to prevent leakage or seepage of electrolyte toward the projection.

Another feature is the provision of a cell terminal arrangement in which an electrode projection extends into an opening of an insulating support, said projection having an enlarged end within said opening, and a terminal member is also located in said opening in electrically conductive relation to the enlarged end, said terminal member having a conductor spring projecting beyond the support.

Another feature is the provision of a cell with an electrode extension and an external terminal member, both located in an opening of an insulating support, and a body of amalgam within the opening for establishing electrical conduction between the projection and the member.

A further feature is the provision of a cell with an insulating support bonded to an electrode, and having other parts of its inner surface exposed to the electrolyte, with a terminal member located in a passage of the support, said passage having its inner end opening opposite the electrode, and with a body of amalgam in the passage for establishing electrical conduction between the electrode and the terminal member, said amalgam being prevented from contact with the electrolyte by a seal between the support and the electrode and surrounding the said opening of the passage.

A further feature is the provision of an anode structure of U-shape, with an integral extension from the bight of the U, said extension being received in an opening of an insulating support, an electrical connection to said extension, and an electrolyte-resistant seal for preventing access of the electrolyte to said connection.

A further feature is the provision of a cell comprising a sealed housing, electrodes, and electrolyte, the electrodes exhibiting a potential difference in the presence of the electrolyte, together with electrode terminal devices mounted in the housing and including external terminal members of materials exhibiting the same electrochemical potential relative to the electrolyte, sealing means for preventing electrolyte contact with the external terminal members prior to electrode exhaustion, and sealing means for preventing escape of electrolyte around the external terminal members.

Another feature is the provision of a cell comprising a sealed housing, electrolyte, and electrodes, one of the electrodes including a material exhibiting frangible characteristics, and an electrode terminal and support connected to the electrode together with binding and sealing means engaged with said electrode and terminal and with the housing to maintain the electrode integral and in position even upon severe mechanical shock.

With these and other features as objects in view, as will appear from the following description and claims, illustrative forms of practice are shown in the accompanying drawings in which:

Fig. 1 shows one form of a cell construction with the outer casing parts in section, and with the electrode and connection parts partly in section and partly in elevation.

Fig. 2 is a sectional view substantially on line 2—2 of Fig. 1.

Fig. 3 is a sectional view substantially on line 3—3 of Fig. 1.

Fig. 4 shows a second form of construction.

Fig. 5 is a detail plan view of the terminal spring of Fig. 4.

Fig. 6 is a sectional view through a punch and die structure for forming anode members.

Fig. 7 is a perspective view of a double unit anode piece made by the structure of Fig. 6.

Fig. 8 is a perspective view of an anode folded form, with the pin projection uppermost.

Fig. 9 is a perspective view of the folded anode of Fig. 8, with one leg largely broken away and with the pin projection turned downward.

Fig. 10 is a view corresponding to Fig. 1, of a further form of cell construction.

Fig. 11 is a top plan view of the structure of Fig. 10.

Fig. 12 is a sectional view substantially on line 12—12 of Fig. 10.

Fig. 13 is a perspective view of an outer terminal piece used with the cathode in Fig. 10.

Fig. 14 is a perspective view of an outer terminal piece used with the anode in Fig. 10.

In many employments of voltaic or electrical energy producing cells, it is desirable to have the assembly tight against the emission of electrolyte. When the cell is to be employed in close adjacency to costly structures which have normal lives far beyond the energizing period of a single battery, protection should be complete both against seepage of electrolyte and also against the possible escape of gas with entrained electrolyte, and also the end of the cell life should not be accompanied by the release of any harmful substance. Such an employment occurs when the cell is to supply electrical energy to actuate a watch, noting that the cell must exhibit adequate shelf-life conditions before it is placed in service, a service life of, say, a year or longer, and must be safe throughout against any release or movement of any material which can attack the watch mechanisms or even act mechanically to change the going of the watch. Style and technical considerations of the watch case demand that the volume and shape of the battery shall make the most efficient use of the available space, with employment of an electrolyte and electrodes which establish low internal resistance on the one hand, and long shelf-life on the other. Further, the cell housing with its electrochemically active ingredients must be capable of easy and direct replacement without any cleaning of parts. Electrical terminal connections must be presented which tolerate the replacement of the battery easily, and the exposed portions must be of material not subject to attack by the atmosphere during shelf and service life: whereas on the other hand, some desirable electrode materials are subject to damage upon such exposure. These problems of a watch battery have been solved in the illustrative forms of practice by having the housing of hermetically sealed type, employing outer terminals which are of different materials than the electrodes, and which are comparatively resistant to damage from atmospheric corrosion, and employing multiple sealing and bonding compositions for obtaining both mechanical strength and separation of non-electrode metal parts from the electrolyte whereby to exclude the formation of parasitic voltaic effects. A simplification of the maintenance of the watch is attained by having the yielding or conforming part of the electrical connectors, by which current passes from the cell to the watch motor parts and back, mounted on the cell so that a rigid watch movement terminal can be used, and any accidental deformation occurs only on the cheaper and easily replaceable cell structure.

In the form of construction shown in Figs. 1 to 3, the outer housing may be made with a receptacle of a material which is non-reactive to the electrolyte. Such may be molded from a non-conductive plastic, with closely spaced walls having arcuate edges and a peripheral connecting wall.

A cover 11 of such material is illustratively shown as sealed at the lip of the case 10 and serves as a support for the electrodes with their terminal structures. Its central portion is of thin section, while bosses 12, 13 are provided adjacent the ends. A peripheral rebate 14 accurately fits the lip of the case 10, and the parts are united in sealed assembly by applying a bonding agent, which may be a solvent for the case material possibly with some of such material in solution for controlling the viscosity, or it may be a cementitious electrolyte-resistant material.

The cathode 20 may be made of a mixture including conductive silver powder and a depolarizing metal oxide such as mercuric oxide in fine particle form bonded and held by sponge-like septum walls of an inert plastic. Such an electrode composition and mass is described and claimed in the copending application Ser. No. 297,011, filed July 3, 1952. As shown in Figs. 1 and 2, the shape conforms generally to the inner surfaces of the receptacle walls, with an electrolyte spacing of about 0.005 inch for a small battery intended for use in an electrically actuated wrist watch. The mass is molded with a cavity 21 having a slightly tapered form.

The terminal construction at the cathode provides for adequate electrical conduction and mechanical supporting strength for the mass, which becomes weaker during cell activity. The boss 12 has an opening therethrough with a smaller part 22 at the inner end and a larger part 23 at the outer end, with a shoulder 24 between them. A conductive pin 25, which is cathodic to the depolarizing material, e. g. of silver for the above cathode mixture, has an enlarged end 26 engaging the shoulder 24, and its stem passes through the smaller part 22 of the opening. It is preferred to enlarge the pin at the inner surface of the boss 12, as by a staking operation, to provide enlargement 27 which holds the pin mechanically in place. The end of pin 25 extends into the cavity 21: during assembly, a conductive lacquer or cement is placed in the cavity, and then the parts are brought together at their contiguous areas and the cement caused to set as an electrolyte-impervious layer 28 so that the pin is bonded to the cathode mass over large areas and the pin forms a conductive extension of the cathode and has an interengaging supporting connection to the support. During assembly, a bonding and sealing compound, e. g. a semi-liquid cementitious solution of an electrolyte-resistant synthetic resin in a volatile solvent is applied to the contiguous areas of the support 11, 12 or of the cathode 20, or both, so that upon setting thereof, a continuous impervious layer 29 is formed whereby electrolyte is prevented from access to the opening or the pin 25. Further, a bonding and sealing compound is preferably employed as a peripherally continuous layer 29a around the pin 25 to secure and seal it in the opening.

An outer cup 30 of conductive material resistant to the atmosphere, for example of silver, is inserted into the enlarged part 23 of the opening and when seated therein is in electrically conductive relation at its bottom with the enlargement or head 26 of the pin 25. The cup for its major skirt area fits loosely in the opening, but preferably has a peripheral rib or flange 31, which may be formed as a head when the cup is formed by stamping from sheet metal. It is preferred to place a conforming mass 33, for example silver, cadmium, or indium amalgam or mercury (which are herein referred to as conductive mercury materials), upon the enlarged end 26 during assembly, and holding the parts together until the mercury amalgamates with the parts, to assure a mechanical and electrically conductive and bonding relation thereof with the cup. With batteries in which the cup and pin parts are of small size, e. g. in a watch cell, it is preferred to employ plastic amalgams having relatively low mercury content in order to avoid excessive loss of strength of the parts as the mercury diffuses. Sealing compound 34 is introduced around the cup to prevent access of the atmosphere to the contact zone and to hold the cup 30 fixedly in position and to provide further assurance against outward leakage of electrolyte: the rib 31 acts to prevent extensive movement of the mass beneath the cup. The mass 33 may alternatively be provided by a drop of conductive lacquer or by a piece of indium metal. The cup 30 may have a projecting spur 32 at its bottom which is seated into the upper surface of the head 26, to assure electrical contact with or without the conforming mass 33; and to prevent penetration of the sealing compound 34 to prevent the current flow.

A small coil spring 35, e. g. of beryllium copper, is wound with an outer diameter slightly greater than the internal diameter of the cup 30; and is introduced by torsionally tightening the coils to reduce the diameter. Upon insertion and release, the resilient return of the spring produces an effective grip within the cup. This spring projects externally beyond the lip of the cup and beyond the support, for easy engagement with an opposing contact member forming part of the external circuit to be fed by the cell.

A slightly differing construction is shown for the anode 40, and is preferred for this electrode when made of a ductile metal (e. g., zinc, tin, indium). A manner of making such an anode is shown in Figs. 6 to 9, where a blank 41 of the selected metal is placed in a die 42 having a rib 43 and cavities 44 with knock-out plungers 45. When the punch 46 is forced down, plastic flow occurs in the metal, and a double unit is formed, as shown in Fig. 7, comprising the two plates 47 joined across a thin web 48 formed by the rib 43, each plate having an arcuate edge and a projecting pin 49 formed by the respective cavity 44. When the punch is retracted, the double unit is ejected by the knock-out plungers 45. The units are separated by severing at the web 48, and each unit is then formed by bending about the dotted lines 50 (Fig. 7), producing an electrode structure of U shape having the two legs 51, each with an arcuate edge, connected by a bight having a flat top to conform to the illustrated inner surface of the cover boss, and an integral projecting pin 49 extending from the bight of the U. It is preferred to form the plates by a punch 46 having cavities 52 opposite the cavities 44 of the die, so that the electrode structure has a greater cross section at the area 53 in the transverse plane of the pin 49 (Fig. 9).

The anode 40 is assembled to the support 11, 13 by passing the pin 49 into an opening or passage in the boss 13. The opening has a smaller diameter 55 at the inner end and a larger diameter 56 at the outer end, providing a tapered shoulder 57. The assembly is preferably accomplished after applying an electrolyte-resistant compound over the contiguous areas of the electrode and support to form a continuous bonding and sealing layer 29 surrounding the opening 55 and the pin 49. Also preferably a continuous bonding and sealing mass is employed over the length of the pin 49 as a layer 29a filling the annular space between the pin and the wall of the hole portion 55. After fitting together, the outer end of pin 49 is formed with an enlarged or rivet head 59 engaged with the shoulder 57 for mechanically supporting the electrode, and cooperating with the bonding and sealing layer 29a to secure the parts.

The external electrical connection for the anode is shown as identical with that for the cathode, in the form of Figs. 1–3. That is, the cup 30 has a flange 31 and is secured and sealed by the mass 34; and receives the conductive coil spring 35. A mass 33 is employed as before for maintained electrical contact.

Thus, the case provides a main receptacle or portion for the electrolyte and electrodes, and other portions are therein provided by the respective passages for receiving terminal pieces and the junctions therebetween.

In the form of construction shown in Fig. 4, the cathode 20 and the anode 40 are assembled with a cover 11 having the bosses 12a, 13a with the openings or passages 22, 23 and 55, 56 therein; and sealed to the case 10. The conductive pin 25a is conductively bonded and sealed in a cavity 21 of the cathode 20 by the layer 28; and has the enlarged outer end 26a engaged with the shoulder between the parts 22, 23 of the cathode terminal opening, and sealed by the layer 34. The pin 25a is mechanically held to the support 11, 12a by the expanded portion 27. The sealing and bonding mass 29 holds the cathode in place, and separates the electrolyte from the pin 25a and the passage 22, 23. The mass 29a seals and bonds the part of pin 25a located in the passage 22. The difference is the omission of the separate cup and coil spring, and the employment of an offset hair-pin type of conductive spring 35a (Figs. 4 and 5) which can be spot welded.

At the anode 40, the conductive extension 49 extends through the smaller part 55 of the opening and has an upset or riveted enlargement 59 at the outer end engaged with the shoulder 57. An outer terminal member 30a has an external conductive spring 35a secured thereto, and a spur 30b at its inner surface for mechanical engagement into the enlargement 59 to assure metal-to-metal contact. The composition layer 34 bonds the member 30a in position and prevents atmospheric access to the anode; and acts to assure against electrolyte leakage, being of particular value when the anode has been consumed.

In the form shown in Figs. 10 to 14, the cathode 20 and the anode 40 are like those of Figs. 1–4, and are supported on the cover 11, 12, 13 as before, with use of the pin 25 at the cathode and the integral extension 49 at the anode. Sealing and bonding layers or masses 28, 29, 29a are employed as before. In this form the cups 30 and coil springs 35 are replaced by blade spring arrangements. A preferred arrangement at the cathode has a springy terminal connector piece (Fig. 13), of beryllium copper for example, with an originally flat leg 30k, 30m and an angularly directed apertured foot 30n, receives the pin 25 before this pin is passed into the opening 23, 22: in forming the projection 27, the parts are drawn tightly together. The external sealing mass 34 is then introduced and cured for sealing the opening and assuring that the conductor piece is held in position. Finally, the end 30k of the conductor piece is bent from its original position (dotted in Fig. 10) to the curved full line position. A preferred arrangement at the anode end comprises forming the rivet head or enlarged end 59 on the anode extension 49 with a groove into which is fitted the foot 30t of the springy anode terminal connector piece (Fig. 14), whereupon the material in the groove side walls is staked over the foot 30t (Fig. 12) for providing a firm mechanical and electrical junction within the opening and isolated from the interior of the electrolyte receptacle by the anode body and the sealing materials. The outer sealing mass 34 is added and cured; and the end 30r of the external terminal piece is bent to form, while the lower part 30s of the leg remains held and sealed by the mass 34.

While the illustrative preferred forms for anode and cathode differ, it is obvious that like structures may be used at both.

The illustrative cell may be made by assembling the electrode members and their terminals upon the cover 11; and the cover bonded and sealed in place on the receptacle 10 to provide an essentially sealed housing except for an opening 60 provided in the cover. The electrolyte is charged into the cell through this opening by a filling nozzle; or, preferably, by submerging the assembly under the liquid surface of electrolyte in a jar and then drawing and releasing a vacuum upon the jar of, say, 5 mm. whereby to extract air and gas from the electrolyte and electrodes and to complete the filling. After the filling, the external walls are cleaned, and a plastic sealing piece 61 of case material is bonded in sealing relation over the hole 60, e. g. by first dipping the piece in a liquid including a volatile active solvent and then maintaining it in place over the hole until the solvent has evaporated from the diffusion film between the cover and the piece and a tight seal has been effected.

An advantage of the arrangement herein described is that an alkaline electrolyte system can be set up and operated under hermetically sealed conditions, that is, without damage by the inward leakage of atmospheric air or other fluids or by the outward leakage of electrolyte.

It has been found preferable to accomplish the bonding and sealing with differentiated compositions. The cathode and its terminal assembly, with the employment of a conductive pin 25 as a cathode extension, includes the conductive composition mass 28 between the pin and the cavity wall; the composition mass 29 acts over large contiguous areas to bond the cathode and the support 11, 12; the sealing or packing composition mass 29a between the pin and the wall of the passage; and the outer rigid sealing and form-maintaining composition mass 34 between the outer terminal piece and the wall of the passage.

The mass 28 must be conductive and resistant to the electrolyte which can enter the pores in the cathode. A preferred composition is 1 part by weight of silver powder and 1 part by weight of polyvinyl formal, dissolved in ethylene dichloride to give a desired viscosity which may be about that of syrup, for example 10 to 15 parts of the solvent.

The mass 29, employed during assembly of the cathode to the support, need not be conductive but in practice the same composition may be used as for the mass 28;

such added conductivity over the upper surface of the cathode is of advantage during the initial operation of the battery before reduced mercury has acted to increase the conductivity of the cathode mass. The functions of the mass 29 are to assist in mechanical attachment of the cathode to the cover, and to restrict the penetration of electrolyte toward the opening 22.

The mass 29a has the function of sealing against outward leakage of the electrolyte toward the electrical junction. A desirable composition for the mass 29a is 4 parts by weight of polyethylene of low molecular weight having a cup-grease consistency (commercially available material known as DXL-2 is satisfactory), 1 part of polyisobutylene, i. e. a synthetic elastomer which is employed to confer a desired elasticity, and 1 part of polybutene which is incorporated to increase the tackiness. The three components may be blended on a rubber mill or by mixing separate solutions thereof in a chlorinated hydrocarbon solvent (such as perchlorethylene, ethylene dichloride or dichlorethylene). It can be introduced as a viscous solution in such solvents, the quantity of solvent being adjusted to obtain the consistency desired: about 50% solids is satisfactory and preferred. The thickly viscous, sticky and volume-maintaining condition is desirable. The composition is highly resistant to alkaline electrolytes, able to remain soft and tacky, and able to "wet" and adhere closely to metals, mercury and amalgams, and provide packings between amalgams or metals and plastics which prevent the creepage of strong alkali solutions through the packed joints.

The mass 34 is preferably a resin which is introduced as a liquid and sets to solid form at a low temperature by the action of a catalyst: it has functions of preventing access of atmospheric air and any other ambient fluid to the electrical junction, of acting as a safety seal in the event that electrolyte passes the seal 29a, thereby protecting mechanical structures (e. g. the watch balance, train and plates in a watch assembly) against corrosion and mechanical blockage from cell material, and of bonding the external terminal pieces in position. Accordingly, it must essentially maintain volume and shape during and after setting, and must not shrink and draw away from the contacted surfaces. A preferred resin is a condensation product of poly-arylethylene oxide compounds with an acid anhydride, an amine, or another compound.

At the anode, the bonding and sealing includes the masses 29, 29a and 34. The same materials may be employed as at the cathode, noting that silver powder should not be included in the anode layer 29 since an integral anode body is highly conductive and the presence of the silver grains may establish parasitic effects.

A general property of these compositions is resistance to alkaline electroyltes. Masses of compositions 28, 29 and 34 have effective bonding strength: and the mass of composition 29a gives clinging and permanently tacky and non-brittle films. Conductivity must be conferred to the mass 28 by incorporating silver powder unless the electrical connection between pin and wall in a particular case is effected by other means such as tight mechanical fit or use of silver-mercury amalgam.

The preferred differentiation of the compositions employed at the several places has given excellent results. It is possible to employ other materials at the places: for example, the setting resin above described for the mass 34 can be employed throughout, with conductive metal powder (e. g. silver) for the mass 28 and with an electrolyte-resistant non-volatile plasticizer (e. g. divinylbenzene) for the mass 29a. The composition above described for the mass 29a may be employed for the places 29 and 34 when mechanical bonding and supporting strength is not demanded in a particular cell.

Other substitutes for the mass 28a include polyvinyl chloride, acetal and butyral, polystyrene, and mixtures of the permissible materials: with inclusive of conductivity powders. Such likewise may be employed for the mass 29, noting that conductivity powder is preferably omitted at the anode; and silicones resistant to alkaline solutions. Polyvinyl butyral or such a silicone may be employed for the mass 29a; or polyvinyl chloride plasticized by polyisobutylene. Alkyd resins resistant to strong alkaline solutions and cell products may be employed for the mass 34.

It is obvious that the illustrative practices are not restrictive, and that the invention may be practiced in many ways within the scope of the appended claims.

What is claimed is:

1. A cell construction comprising a support having an opening therein, an electrode having a cavity associated with the opening, said support and electrode having contiguous areas surrounding said opening, a conductive member extending from said opening into the cavity, said conductive member and support having an interengaging supporting connection, a conductive bond connecting the conductive member to the cavity wall, and an electrolyte-impervious layer bonding the electrode to the support over said areas, said construction including means for preventing leakage of electrolyte outwardly along said conductive member.

2. A cell construction comprising a support having an opening therein, an electrode having a cavity associated with the opening, said support and electrode having contiguous areas surrounding said opening, a conductive pin extending from the opening into the cavity, said pin and support having an interengaging supporting connection, a conductive bond connecting the pin to the cavity wall, and an electrolyte-impervious layer bonding the electrode to the support over said areas, said construction including means for preventing leakage of electrolyte outwardly along said pin.

3. A sealed electrical energy producing cell including a housing, an anode, a cathode, electrolyte and leadout elements extending from the anode and cathode through the housing wall, characterized in the sealing of the anode leadout element to the housing by a pressure sensitive tacky electrolyte-impervious material effective to prevent the formation of a parasitic galvanic couple.

4. A sealed electrical energy producing cell including a housing, an anode, a cathode, electrolyte, and extensions from anode and cathode located in the housing wall, characterized by the presence of outer terminal members having electrical junctions to the respective extensions, and sealing means at the anode for preventing electrolyte access to the anode outer terminal and effective during the service life of the cell to prevent the formation of a parasitic galvanic couple, said outer anode terminal member being of a metal having essentially the same electrochemical potential as the cathode, said cell upon consumption of the anode having like metal presented at each pole whereby to inhibit further galvanic action.

5. A cell terminal construction comprising a support having an opening therethrough with an enlarged outer portion providing a shoulder, an electrode having a cavity associated with the opening, said support and electrode having contiguous areas surrounding said opening, a conductive pin extending from the opening into the cavity, said pin having an enlarged outer end engaged with the shoulder, and an expanded portion engaging the support around the smaller end of the opening, a conductive bond connecting the pin to the cavity wall, and an electrolyte-impervious layer bonding the electrode to the support over said areas.

6. A cell construction as in claim 5 in which a metal cup is located within the enlarged part of the opening, a body of amalgam is positioned in conductive relation between the enlarged end of the pin and the bottom of the cup, and in which the impervious cement extends along the pin for bonding the same in said opening and preventing access of electrolyte to the amalgam.

7. A cell construction comprising a support having an opening with an enlarged outer portion providing a shoulder, an electrode having a conductive extension located in the opening, said extension having an enlargement engaged with the shoulder, a metal cup in the enlarged portion of the opening and in conductive relation with the said enlargement, a coil spring engaged in the cup and projecting therefrom, and a sealing cement between and bonding the electrode and extension to the support and effective to prevent access of electrolyte to the cup.

8. A cell construction comprising an electrolyte-retaining receptacle, a cover fitting the open end of the receptacle and sealed thereto, said cover having inward projectons each having an opening, anode and cathode elements having projections extending into respective said openings, electrolyte-resistant cement bonding said elements to the cover and sealing off the electrolyte from said projections and openings, metal spring supports in electrical conductive relation to the projections and secured in said openings, springs connected to the spring supports and extending for effecting electrical conduction therefrom, and an electrolyte in said receptacle and surrounding said elements.

9. An anode structure and support comprising an insulating support piece having an opening with an enlarged outer end providing a shoulder, an anode having a pin projecting into the opening, the end of the pin being enlarged to bear against the shoulder, cement between the anode and the support and between the pin and the opening wall for bonding the same mechanically and for sealing the enlarged end of the pin from the electrolyte, and a terminal member in conductive relation to the said enlarged end.

10. An anode structure as in claim 9, in which the anode is of U shape and the cross-section of the bight of the anode is larger adjacent the pin so that the anode while being consumed has its mass shrink toward the pin.

11. A voltaic cell construction comprising a housing having an opening with an enlarged outer end, a non-conductive sleeve in said opening, a conductive pin secured in the sleeve in liquid-tight relation and having an enlarged head in said enlarged end, an electrode having a cavity into which the sleeve extends and a hole at the bottom of the cavity into which the pin extends, and means for securing said sleeve in the opening and in the cavity in liquid-tight relation, said pin being conductively secured in the hole of said electrode.

12. A voltaic cell construction comprising a housing having an opening, a cathode, a non-conductive sleeve in said opening, a conductive pin in said sleeve, an anode having a cavity into which the sleeve extends and a hole into which the pin projects and in which it is conductively seated, the material of the pin having an electrochemical potential relative to the cathode, means for securing said sleeve in the opening and in the cavity in liquid-tight relation, and means for securing said pin in the sleeve in liquid-tight relation.

13. A voltaic cell construction as claim 12, in which at least the outward part of said conductive pin is of a material having a different electrochemical potential than the material of the anode.

14. A voltaic cell construction comprising a housing having an inwardly projecting boss, said boss having an opening, an electrode having a projection extending into the opening and having a surface opposite the inner end of the boss, an outer metal terminal piece located in the opening, amalgam material within the opening and connecting the extension to the outer terminal piece and a seal of electrolyte-resistant material contacting said surface and the inner end of the boss for preventing access of electrolyte to said amalgam.

15. A voltaic cell construction as in claim 14, including sealing means effective to prevent electrolyte movement along the electrode projection.

16. The process of forming a terminal connection for an electrode in a voltaic cell having a housing with an opening therein, the electrode having an amalgamatable metal projection part located in the opening and an outer amalgamatable metal terminal part in the opening, which comprises placing a plastic mercury material on one of said parts, bringing the said parts together in the opening with the material in contact with both said parts, and maintaining the parts in position until the material has formed a stiff conductive bonding layer therebetween.

17. The process of forming a terminal connection for an electrode in a voltaic cell having a housing with an opening therein, the electrode having an amalgamatable metal projection part located in the opening and an outer amalgamatable metal terminal part in the opening, which comprises introducing a plastic mercury material into the opening, bringing the said parts together with the material therebetween, and maintaining the parts in position until the material has amalgamated therewith.

18. A cell structure comprising a support of insulating material having an opening, an electrode having an integral extension in said opening, said electrode abutting said support at an area surrounding said opening, an externally accessible terminal member, said extension and said terminal member being of amalgamatable metal, an intermediate layer of amalgam positioned between the extension and the terminal member for establishing conductive relation therebetween, and an electrolyte-impermeable cement bonding said support and electrode at said area and preventing access of electrolyte to said opening, said extension having an enlargement for mechanically holding the electrode to said support.

19. A cell structure comprising a support of insulating material having an opening, an electrode having an integral extension in said opening, said electrode abutting said support at an area surrounding said opening, and an electrolyte-impermeable cement bonding said support and electrode at said area and preventing access of electrolyte to said opening, said extension having a riveted head spaced from the electrode abutment engaging the support for mechanically holding the electrode to said support.

20. A cell structure comprising a support of insulating material having an opening with a shoulder located between the inner and outer surfaces of the support, an electrode of material consumed during the cell action having an integral extension of the same material in said opening, said electrode abutting said support within the cell at an area surrounding said opening, and an electrolyte-impermeable cement bonding said support and electrode at said area and preventing access of electrolyte to said opening, said extension having an enlargement engaged with the shoulder for mechanically holding the electrode to said support, an external electrical contact terminal extending into the opening and electrically connected to said extension therein, said cement also being present interposed between the electrode extension and the support for maintaining the electrode in place on the support.

21. A cell structure comprising a support of insulating material having an opening, an electrode having a cavity, a pin extending from said cavity into said opening, said pin having a projection spaced from the electrode for holding the pin in the support, said electrode abutting said support at an area surrounding said opening, and a conductive cement in bonding relation to the pin and cavity wall.

22. A cell construction as in claim 21, in which the said area surrounds the pin, and electrolyte-resistance cement is present in bonding relation between the electrode and support at said area and is effective for preventing access of electrolyte to the pin.

23. A cell structure comprising a support of insulating material having an opening having larger outer and smaller inner portions, an electrode having an integral extension in said opening, said electrode abutting said support at an area surrounding said opening, an externally accessible terminal member comprising a metal cup having the major part of its outer wall loosely fitting the said outer portion, said cup having an external peripheral flange closely engaging the wall of said outer portion, and an electrolyte-impermeable cement bonding said support and electrode at said area and preventing access of electrolyte to said opening, said extension having an enlargement for mechanically holding the electrode to said support, said cement being present both axially above and axially below said flange.

24. A cell structure comprising a support of insulating material having an opening, an electrode having an integral extension in said opening, said electrode abutting said support at an area surrounding said opening, a conductive terminal member having a peripheral reduced portion, an electrolyte-impermeable cement bonding said support and electrode at said area and preventing access of electrolyte to said opening, said extension having an enlargement for mechanically holding the electrode to said support, said cement also engaging the terminal member in the reduced portion, and a connector spring secured to the outer surface of the terminal member.

25. A cell structure comprising a support of insulating material having an opening, an electrode having an integral extension in said opening, said electrode abutting said support at an area surrounding said opening, an external terminal member extending in said opening, and an electrolyte-impermeable cement bonding said support and electrode at said area and preventing access of electrolyte to said opening, said extension having an enlargement spaced from the electrode for mechanically holding the electrode to said support, said terminal member having a spur at its inner end in metallic contact with the outer end of the electrode extension.

26. A cell structure comprising a support of insulating material having an opening with a shoulder therein between the inner and outer surfaces of the support, an electrode of material consumed during the operation of the cell and having an integral extension of the same material projecting in said opening, said electrode abutting said support at an area surrounding the inner end of said opening, an electrolyte-impermeable cement bonding said support and electrode at said area and preventing access of electrolyte to said opening, said extension having an enlargement engaging the shoulder and mechanically holding the electrode to the support, and an outer conductive terminal piece having a part in the outer portion of the opening and electrically connected to the said extension within the opening.

27. A cell structure comprising a support of insulating material having an opening with a shoulder between the inner and outer surfaces of the support, an electrode of material consumed during the operation of the cell and having an integral extension of the same material in said opening, said extension having an enlarged outer end mechanically engaged with the shoulder for maintaining the electrode and support together, an externally accessible terminal member mechanically and conductively engaged with said outer end, and a plastic electrolyte-sealing gasket around said extension and engaged with said electrode and said support to prevent movement of electrolyte to said terminal member.

28. A voltaic cell construction comprising a housing of insulating material and having an opening with a shoulder between the inner and outer surfaces of the housing wall, an electrode of material consumed during the cell action and having a restricted integral projection of the said electrode material extending into the opening and having an enlarged end engaged mechanically with the shoulder for holding the electrode and its extension in position, an outer terminal piece of material different from the anode projection and having an end located in the opening, said ends being in abutting conductive relation within the opening, and conductive bonding means connecting the ends of the projection and of the piece.

29. In a sealed electrical energy producing cell having a housing forming no part of the electrochemical system, an anode of material consumed during the cell action, a cathode, an electrolyte; said anode, cathode and housing being exposed to said electrolyte; the combination wherein the housing has an inwardly projecting thickened portion with an opening therethrough having a shoulder along its length between the inner and outer surfaces of the thickened portion, said anode having an integral projection of its material located in said opening and terminating outside the housing space in which the body of said anode is located and having at its outer end an enlargement engaged with said shoulder, said anode having a surface located adjacent the inner surface of the thickened portion over an area surrounding the opening, and means interposed between and contacting the said anode and the thickened portion for isolating the said projection from the electrolyte.

30. A cell structure comprising a support of insulating material having an opening with a larger outer and smaller inner bore portion, with a shoulder therebetween, a consumable anode having an integral extension of its material in said smaller bore portion, said anode abutting said support at an area surrounding the inner end of said opening, an external terminal member extending in said larger bore portion, and an electrolyte-impermeable cement bonding said support and electrode at said area and preventing access of electrolyte to said opening, said extension having an enlargement spaced from the body of the anode and located in said larger bore portion in engagement with said shoulder for mechanically holding the anode to said support, said terminal member and the outer end of the anode extension having means thereon for mechanically interlocking the same.

31. An electrical energy producing cell comprising a case with electrodes and electrolyte therein, a said electrode being consumable during the cell action, and having an integral extension of the same material, said case having an opening for receiving said electrode extension, the said consumable electrode having a part of its surface abutting the wall of the case for an area adjacent the opening, the wall of the opening having various diametrical dimensions with a larger outer portion and a smaller inner bore portion and a shoulder therebetween, said electrode extension occupying the smaller bore portion and having a lateral integral enlargement engaged with the shoulder, and a sealing medium located along said opening wall and along said extension for preventing leakage along the smaller bore past the sealing medium, said part of the electrode surface and said lateral extension being effective to prevent relative movement of the consumable electrode and the case.

References Cited in the file of this patent

UNITED STATES PATENTS

| | | |
|---|---|---|
| 406,223 | Lee | July 2, 1889 |
| 1,136,111 | Erwin | Apr. 20, 1915 |
| 1,226,290 | Willard | May 15, 1917 |
| 1,609,583 | Sokolow | Dec. 7, 1926 |
| 2,175,686 | Eddy | Oct. 10, 1939 |
| 2,424,149 | Chaplin | July 15, 1947 |
| 2,475,152 | Rock | July 5, 1949 |
| 2,641,624 | Winckler et al. | June 9, 1953 |